United States Patent
Verdier

(10) Patent No.: US 12,241,532 B1
(45) Date of Patent: Mar. 4, 2025

(54) COMPACT TORQUE CONVERTER ASSEMBLY FOR HYBRID MODULE

(71) Applicant: Schaeffler Technologies AG & Co. KG, Herzogenaurach (DE)

(72) Inventor: Joshua Verdier, Lodi, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 18/434,980

(22) Filed: Feb. 7, 2024

(51) Int. Cl.
| | |
|---|---|
| *F16H 45/02* | (2006.01) |
| *B60K 6/387* | (2007.10) |
| *B60K 6/40* | (2007.10) |
| *B60K 6/48* | (2007.10) |
| *F16H 45/00* | (2006.01) |
| *H02K 7/00* | (2006.01) |

(52) U.S. Cl.
CPC ............. *F16H 45/02* (2013.01); *B60K 6/387* (2013.01); *B60K 6/40* (2013.01); *B60K 6/48* (2013.01); *H02K 7/006* (2013.01); *F16H 2045/002* (2013.01); *F16H 2045/0284* (2013.01)

(58) Field of Classification Search
CPC ............... F16H 45/02; F16H 2045/021; F16H 2045/0284; F16H 2045/002; B60K 6/387; B60K 6/40; B60K 6/48; B60K 2006/2845; H02K 7/006
See application file for complete search history.

(56) References Cited

U.S. PATENT DOCUMENTS

| | | | |
|---|---|---|---|
| 10,899,220 B1* | 1/2021 | Payne | F16H 45/02 |
| 2021/0348674 A1* | 11/2021 | Nelson | H02K 7/10 |

FOREIGN PATENT DOCUMENTS

JP    H09229159 A  * 9/1997  ..... F16H 2045/0278

* cited by examiner

*Primary Examiner* — Richard M Lorence

(57) ABSTRACT

A hybrid module includes a rotor carrier having an axially extending portion and a radially extending portion; and a torque converter assembly arranged radially inside of the axially extending portion. The torque converter assembly includes: an impeller having an impeller shell non-rotatably connected to the axially extending portion; a turbine in fluid communication with the impeller and having a turbine shell arranged axially between the impeller and the radially extending portion; and a lock-up clutch. The lock-up clutch includes a plurality of clutch plates, a clutch plate carrier connected to at least some of the plurality of clutch plates, and a piston axially slidable along the clutch plate carrier to engage the plurality of clutch plates. The clutch plate carrier is non-rotatably connected to the turbine shell. An apply chamber is bounded in part by the turbine shell, the piston, and the clutch plater carrier.

20 Claims, 2 Drawing Sheets

COMPACT TORQUE CONVERTER ASSEMBLY FOR HYBRID MODULE

TECHNICAL FIELD

The present disclosure relates generally to a hybrid module and, more specifically, to a torque converter for a hybrid module.

BACKGROUND

Hybrid modules are generally known. Often, it is a challenge to package and/or fit all the desired components, e.g., an e-motor, crank damper, torque converter, torque converter clutch, K0 clutch, and resolver within the hybrid module architecture due to axial constraints. Due to limited spacing within a hybrid module envelope, it is desirable to have alternative designs and configurations to fit all the necessary components within the hybrid module while still meeting durability and performance requirements.

SUMMARY

Embodiments of the present disclosure provides a hybrid module including a rotor carrier having an axially extending portion and a radially extending portion; and a torque converter assembly arranged radially inside of the axially extending portion. The torque converter assembly includes: an impeller having an impeller shell non-rotatably connected to the axially extending portion; a turbine in fluid communication with the impeller and having a turbine shell arranged axially between the impeller and the radially extending portion; and a lock-up clutch. The lock-up clutch includes a plurality of clutch plates, a clutch plate carrier connected to at least some of the plurality of clutch plates, and a piston axially slidable along the clutch plate carrier to engage the plurality of clutch plates. The clutch plate carrier is non-rotatably connected to the turbine shell. An apply chamber is bounded in part by the turbine shell, the piston, and the clutch plater carrier.

In embodiments, the hybrid module may further include an output hub non-rotatably connected to the turbine shell. The clutch plate carrier may be non-rotatably connected to the turbine shell radially outside of the output hub. The output hub may include an apply channel in fluid communication with the apply chamber. The apply chamber may be further bounded in part by the output hub. The piston may be sealed to the output hub. The piston may be axially slidable along the output hub carrier to engage the plurality of clutch plates.

In embodiments, the hybrid module may further include a K0 clutch configured to drivingly connect the rotor carrier a K0 shaft. The K0 clutch may include a housing non-rotatably connected to the radially extending portion. A remainder of the plurality of clutch plates may be connected to an outer surface of the housing. The K0 clutch may include a plurality of further clutch plates. At least some of the further clutch plates may be connected to an inner surface of the housing. The lock-up clutch may include a reaction plate axially spaced from the radially extending portion. The reaction plate may be connected to one of the clutch plate carrier and the housing. The plurality of clutch plates may be disposed radially outside of the K0 clutch.

In embodiments, the clutch plate carrier may be spaced from the rotor carrier. In embodiments, the piston may be sealed to an inner surface of the clutch plate carrier. In embodiments, the at least some of the clutch plates may be connected to an inner surface of the clutch plate carrier.

Embodiments of the present disclosure further provides a torque converter including an impeller; a turbine in fluid communication with the impeller and having a turbine shell; and a lock-up clutch. The lock-up clutch includes a plurality of clutch plates, a clutch plate carrier connected to at least some of the plurality of clutch plates, and a piston axially slidable along the clutch plate carrier to engage the plurality of clutch plates. The clutch plate carrier is non-rotatably connected to the turbine shell. An apply chamber is bounded in part by the turbine shell, the piston, and the clutch plater carrier.

In embodiments, the torque converter may further include an output hub non-rotatably connected to the turbine shell. The clutch plate carrier may be non-rotatably connected to the turbine shell radially outside of the output hub. The output hub may include an apply channel in fluid communication with the apply chamber. The apply chamber may be further bounded in part by the output hub. The piston may be sealed to the output hub. The piston may be axially slidable along the output hub carrier to engage the plurality of clutch plates.

In embodiments, the piston may be sealed to an inner surface of the clutch plate carrier. In embodiments, the at least some of the clutch plates may be connected to an inner surface of the clutch plate carrier.

Embodiments of the present disclosure further provides a lock-up clutch for a torque converter including: a clutch plate carrier configured to non-rotatably connected to a turbine shell; a plurality of clutch plates; a piston axially slidable along the clutch plate carrier to engage the plurality of clutch plates; and an apply chamber configured to be bounded in part by the turbine shell, the piston, and the clutch plater carrier. At least some of the plurality of clutch plates being connected to the clutch plate carrier.

In embodiments, the piston may be sealed to an inner surface of the clutch plate carrier.

Embodiments of the present disclosure provide the advantageous benefit of providing a compact torque converter assembly for packaging in hybrid modules with limited space. Further embodiments disclosed herein offer design advantages by partially bounding a sealed apply pressure chamber with the turbine shell thereby allowing for the removal of additional components typically required for partially bounding the sealed apply pressure chamber, which can reduce costs and complexity of the torque converter while satisfying packaging constraints in hybrid modules with limited space.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale;

some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
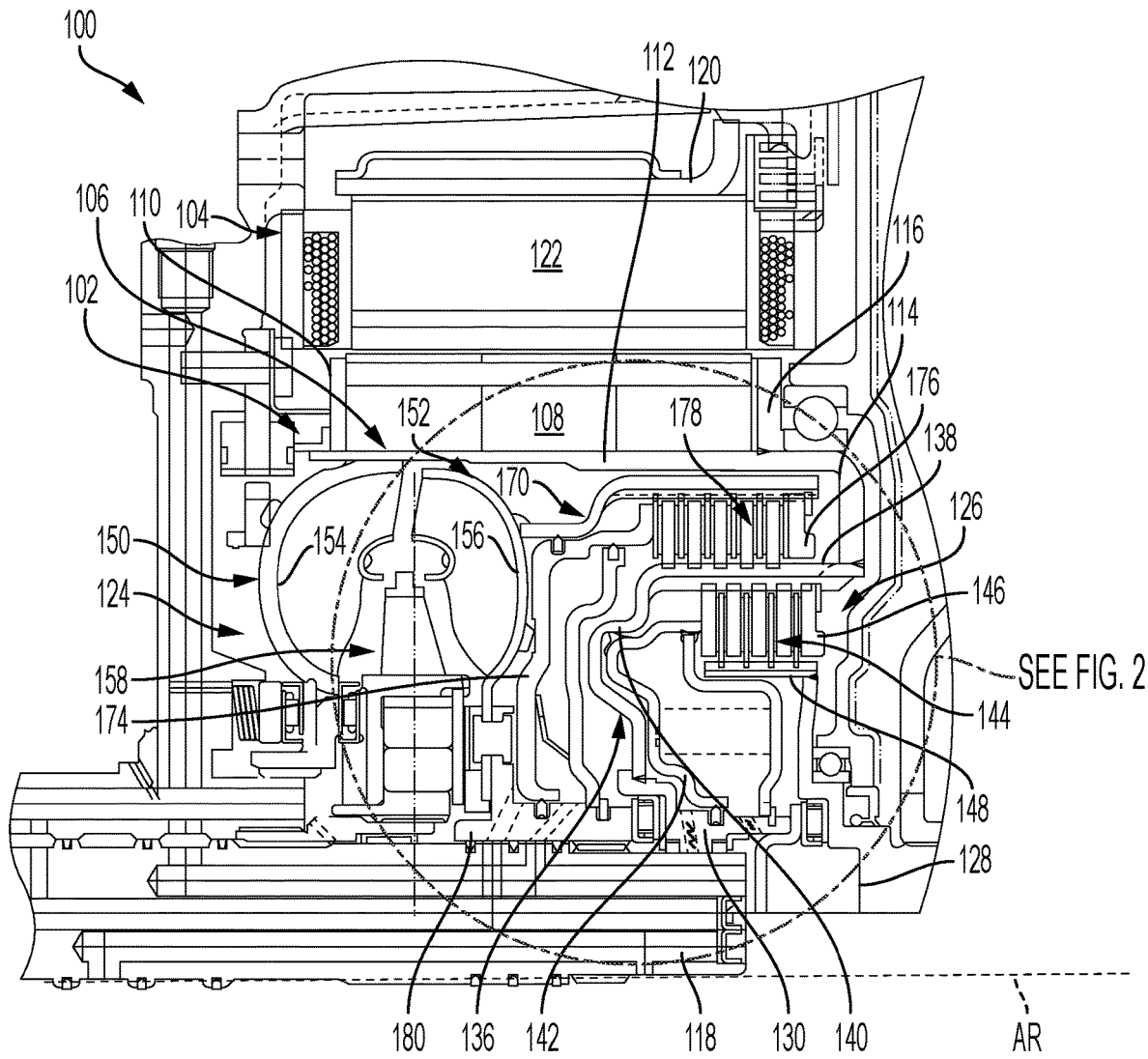
FIG. 1 shows a partial cross-sectional view of a hybrid module according to an exemplary embodiment of the present disclosure.
Figure 2:
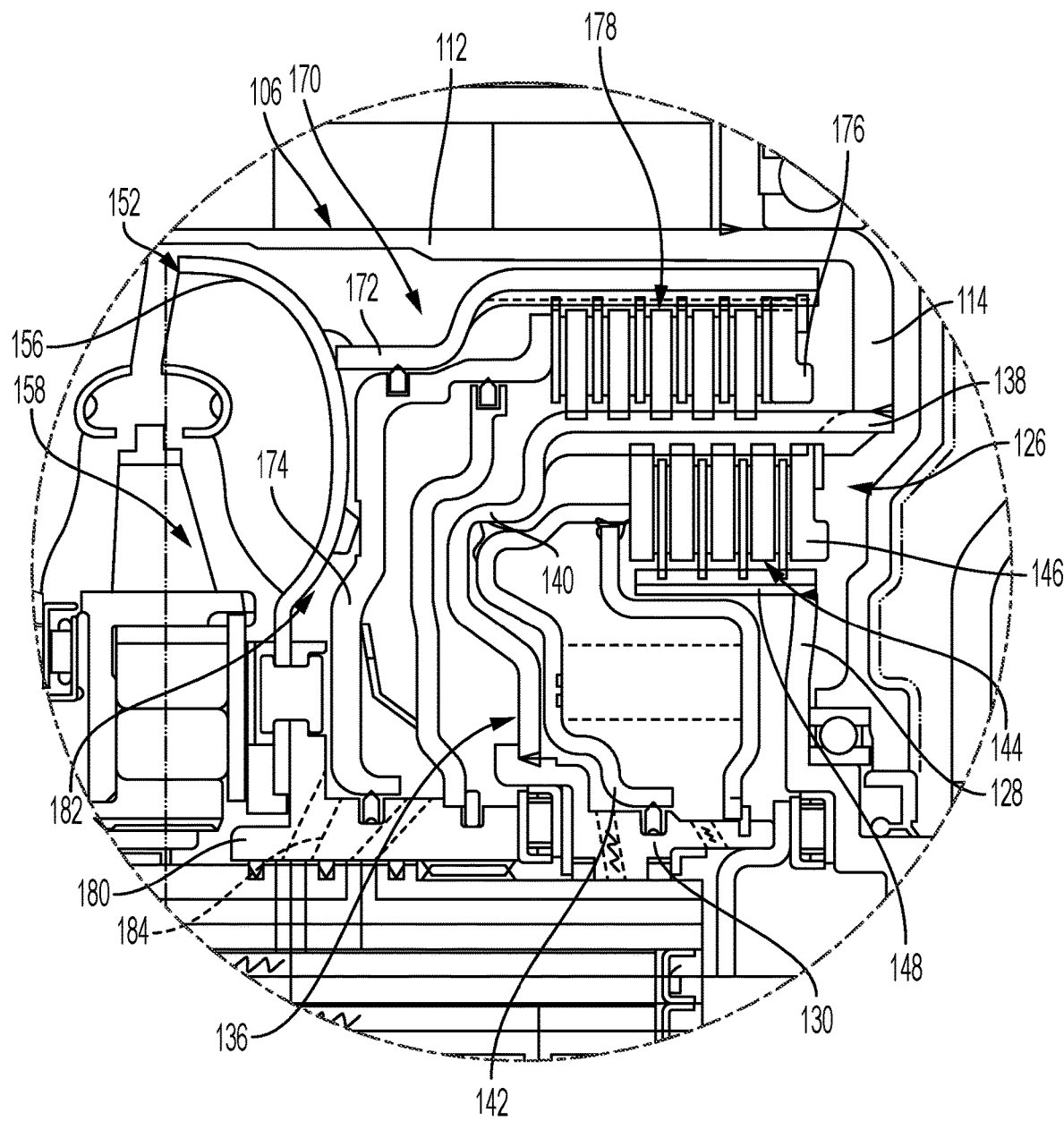
FIG. 2 illustrates an enlarged view of an area of the hybrid module shown in FIG. 1.

Referring to FIGS. 1-2 a portion of a hybrid module 100 is illustrated according to an exemplary embodiment of the present disclosure. At least some portions of the hybrid module 100 are rotatable about an axis of rotation AR. While only a portion of the hybrid module 100 above the axis of rotation AR is shown in FIG. 1, it should be understood that the hybrid module 100 can appear substantially similar below the axis of rotation AR with many components extending about the axis of rotation AR. Words such as "axial," "radial," "circumferential," "outward," etc. as used herein are intended to be with respect to the axis of rotation AR.

The hybrid module 100 includes a rotor assembly 102 and a stator assembly 104 forming an e-motor assembly. The rotor assembly 102 includes a rotor carrier 106, a rotor segment 108, and an end ring 110. The rotor carrier 106 includes an axially extending portion 112, a radially extending portion 114, and a rotor flange 116. The rotor flange 116 is fixed to the axially extending portion 112 of the rotor carrier 106 and extends radially outward away from the axis of rotation AR. The radially extending portion 1114 extends radially inward towards the axis of rotation AR from an end of the axially extending portion 112. The radially extending portion 114 is radially spaced from a transmission input shaft 118. The rotor flange 116 is disposed axially between the rotor segment 108 and the radially extending portion 114.

The rotor segment 108 is installed and arranged on an outer surface of the axially extending portion 112 of the rotor carrier 106. In one embodiment, the rotor segment 108 may be comprised of a stack of segments. The end ring 110 is fixed to the outer surface of the axially extending portion 112 of the rotor carrier 106. The rotor assembly 102 may include a spring end plate (not shown) arranged on an axial side of the rotor segment 108. In this way, the spring end plate may be disposed axially between the end ring 110 and the rotor segment 108. Additionally, or alternatively, the rotor assembly 102 may include a further spring end plate (not shown) arranged on an opposite axial side of the rotor segment 108. In this way, the further spring end plate may be disposed axially between the rotor segment 108 and the rotor flange 116. The end ring 110 is configured to clamp and/or secure the rotor segment 108 to the rotor carrier 106, e.g., via compressing the spring end plate(s), for frictional torque transmission therebetween. Once the desired compression force is achieved, the end ring 110 is fixed to the rotor carrier 106, e.g., by welding.

The stator assembly 104 is disposed radially outside of the rotor assembly 102 and is fixed relative to the rotor assembly 102. The stator assembly 104 includes a stator carrier 120 and a stator segment 122. In one embodiment, the stator segment 122 may be a stack of stator segments. The stator segment 122 is installed and arranged on an inner surface of the stator carrier 120. In one embodiment, the stator segment 122 may be installed on the stator carrier 120 via a shrink fit arrangement. That is, the stator carrier 120 is heated to expand the inner surface, the stator segment 122 is installed on the stator carrier 120, and the inner surface shrink fits to the stator segment 122 after the stator carrier 120 cools.

The hybrid module 100 further includes a torque converter assembly 124 and a K0 clutch 126 each fully disposed radially inside the rotor assembly 102. The K0 clutch 126 is arranged to drivingly connect the rotor assembly 102 to a K0 shaft 128. In other words, the K0 clutch 126 selectively connects and disconnects the rotor assembly 102 and the K0 shaft 128. The K0 shaft 128 is arranged for driving connection with a crankshaft (not numbered) of an internal combustion engine (not shown). In other words, the K0 shaft 128 is arranged to receive torque from the engine and/or transmit torque to the engine when installed and operated in a vehicle powered at least in part by the engine.

The K0 clutch 126 may include a hub 130 supported on and sealed to the transmission input shaft 118. The hub 130 may include an apply channel (not numbered) for providing a hydraulic pressure to the K0 clutch 126 and a balancing channel (not numbered) for providing a balancing oil to the K0 clutch 126.

The K0 clutch 126 includes a housing 136 fixed, at an outer diameter thereof, to the radially extending portion 114, e.g., via a welded connection. The housing 136 may be fixed, at an inner diameter thereof, to the hub 130, e.g., via a welded connection. The housing 136 includes an outer axially extending portion 138 radially spaced from the hub 130. The outer axially extending portion 160, e.g., an outer surface thereof, is connected to the radially extending portion 114. The housing 136 further includes an inner axially extending portion 140 disposed radially between the hub 130 and the outer axially extending portion 138.

The K0 clutch 126 further includes a piston 142, a plurality of clutch plates 144, a reaction plate 146, and a support flange 148. The reaction plate 146 may, e.g., be fixed to the axially extending portion 138, e.g., an inner surface thereof, of the housing 136. As another example, the reaction plate 146 may be fixed to the support flange 148. The support flange 148 is connected, e.g., via a welded connection, to a radially extending outer portion of the K0 shaft 128. The clutch plates 144 are disposed axially between the reaction plate 146 and the piston 142. At least some of the clutch plates 144 may be connected to the support flange 148. At least some of the clutch plates 144 may be connected to the axially extending portion 138, e.g., the inner surface thereof, of the housing 136.

The piston 142 is disposed axially between the reaction plate 146 and the torque converter assembly 124. The piston 142 may be configured to be sealed to the hub 130 at an inner diameter of the piston 142 via a seal (not numbered) and configured to be sealed to the inner axially extending portion 140, e.g., an inner surface thereof, via a seal (not numbered). The seals maintain a fluid separation between a piston apply chamber (not numbered) and the rest of the K0 clutch 126. The piston apply chamber is defined, or bounded, in part between the housing 136, the hub 130, and the piston 142. By "bounded in part," we mean that a portion of the cited chamber, flow path, or other structure is bounded, or formed, by the cited element.

The K0 clutch 126 may include a balance dam (not numbered) disposed axially between the piston 142 and the support flange 148. The balance dam may be fixed to the hub 130, e.g., via staking. In such an example, the balance dam may be sealed to the hub 130 at the staking. The balance dam is sealed to the piston 142 at an outer diameter thereof via a seal (not numbered). The seal maintains a fluid separation between a balance chamber (not numbered) and the rest of the K0 clutch 126. The balance chamber is defined by, or bounded between, the hub 130, the piston 142, and the balance dam.

The K0 clutch 126 may include a resilient element (not numbered) disposed axially between the piston 142 and the balance dam, i.e., in the balance chamber, urging the piston 142 away from the balance dam. In the example embodiment shown, the resilient element 160 includes coil springs. Although coil springs are shown, other resilient elements are possible, e.g., a Belleville washer or a rubber puck.

The piston 142 closes the K0 clutch 126 in response to pressurization of a medium (e.g., fluid such as oil) in the apply chamber. That is, when K0 clutch 126 engagement is desired, pressure is introduced through the apply channel to the apply chamber. Once pressure in the apply chamber reaches a closing pressure, i.e., applies sufficient force on the piston 142, the piston 142 slides along the hub 130 and the inner axially extending portion 140 of the housing 136 engaging and compressing the clutch plates 144 against the reaction plate 146. Meanwhile, flow from the balancing channel flows into a balancing chamber of the K0 clutch 126.

The torque converter assembly 124 includes: an impeller 150 having an impeller shell 154 with at least one blade attached thereto, a turbine 152 having a turbine shell 156 with at least one blade attached thereto; a stator 158 having at least one blade attached thereto; and a lock-up clutch 170. The impeller shell 154 may be fixed to the rotor carrier 106, e.g., via a welded connection. The impeller shell 154 and the rotor carrier 106 together form a housing for the torque converter assembly 124. The lock-up clutch 170 and the stator 158 are disposed within the housing formed by the impeller shell 154 and the rotor carrier 106.

The lock-up clutch 170 includes: a clutch plate carrier 172 non-rotatably connected to the turbine shell 156; a piston 174 disposed axially between the radially extending portion 114 and the turbine 134; a reaction plate 176 fixed relative to the turbine 134; and a plurality of clutch plates 178 disposed axially between the piston 174 and the reaction plate 176. The reaction plate 176 may, for example, be fixed to the clutch plate carrier 172, e.g., an inner surface thereof. As another example, the reaction plate 176 may be fixed to the outer axially extending portion 138, e.g., an outer surface thereof, of the housing 136. At least some of the clutch plates 178 may be connected to the clutch plate carrier 172, e.g., the inner surface thereof. At least some of the clutch plates 178 may be connected to the outer axially extending portion 138, e.g., the outer surface thereof, of the housing 136.

The piston 174 may be sealed to the clutch plate carrier 172, e.g., the inner surface thereof, via a seal (not numbered) and may be sealed, at an inner diameter thereof, to an output hub 180 via a seal (not numbered). The seals maintain a fluid separation between an apply chamber 182 and the rest of the torque converter assembly 124. The apply chamber 182 is defined by, or bounded between, the output hub 180, the piston 174, the clutch plate carrier 172, and the turbine 152.

The output hub 180 may be connected to the turbine shell 156, e.g., via a riveted connection. The output hub 180 is connected to the transmission input shaft 118 for torque transmission therebetween. The output hub 180 may include an apply channel 184 for providing a hydraulic pressure to the lock-up clutch 170 and a balancing channel (not numbered) for providing a balancing oil to the lock-up clutch 170. The clutch plate carrier 172 is non-rotatably connected to the turbine shell 156 radially outside of the output hub 180. That is, a connection between the clutch plate carrier 172 and the turbine shell 156 is radially spaced from the output hub 180.

The lock-up clutch 170 may further include a seal plate (not numbered) disposed axially between the piston 174 and the radially extending portion 114. The seal plate may be fixed to the output hub 180, e.g., via staking. In such an example, the seal plate may be sealed to the output hub 180 at the staking. The seal plate is sealed to the piston 174 at an outer diameter thereof via a seal (not numbered). The seal maintains a fluid separation between a balance chamber (not numbered) and the rest of the torque converter assembly 124. The balance chamber is defined by, or bounded between, the output hub 180, the piston 174, and the seal plate.

The lock-up clutch 170 may further include a resilient element (not numbered) disposed axially between the piston 174 and the seal plate, i.e., in the balance chamber, urging the piston 174 away from the seal plate. In the example embodiment shown, the resilient element includes a diaphragm spring. Although a diaphragm spring is shown, other resilient elements are possible, e.g., a Belleville washer or a rubber puck.

The piston 174 closes the lock-up clutch 170 in response to pressurization of a medium (e.g., fluid such as oil) in the apply chamber 182. That is, when lock-up clutch 170 engagement is desired, pressure is introduced through the apply channel 184 to the apply chamber 182. Once pressure in the apply chamber 182 reaches a closing pressure, i.e., applies sufficient force on the piston 174, the piston 174 slides along the output hub 180 and the clutch plate carrier 172 engaging and compressing the clutch plates 178 against the reaction plate 176. Meanwhile, flow from the balancing channel flows into the balancing chamber of the torque converter assembly 124.

Connecting the clutch plate carrier to the turbine shell and utilizing the clutch plate carrier and the turbine to partially define the apply chamber for the torque converter assembly reduces an axial envelop of the torque converter assembly, which can assist in satisfying packaging constraints in hybrid modules with limited space.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 hybrid module
102 rotor assembly
104 stator assembly
106 rotor carrier
108 rotor segment
110 end ring
112 axially extending portion
114 radially extending portion
116 rotor flange
118 transmission input shaft
120 stator carrier
122 stator segment
124 torque converter assembly
126 K0 clutch
128 K0 shaft
130 hub
136 housing
138 outer axially extending portion
140 inner axially extending portion
142 piston
144 clutch plate
146 reaction plate
148 support flange
150 impeller
152 turbine
154 impeller shell
156 turbine shell
158 stator
170 lock-up clutch
172 clutch plate carrier
174 piston
176 reaction plate
178 clutch plates
180 output hub
182 apply chamber
184 apply channel
AR axis of rotation

What is claimed is:

1. A hybrid module, comprising:
a rotor carrier including an axially extending portion and a radially extending portion; and
a torque converter assembly arranged radially inside of the axially extending portion, the torque converter assembly including:
an impeller having an impeller shell non-rotatably connected to the axially extending portion;
a turbine in fluid communication with the impeller and having a turbine shell arranged axially between the impeller and the radially extending portion; and
a lock-up clutch including a plurality of clutch plates, a clutch plate carrier spaced from the rotor carrier and connected to at least some of the plurality of clutch plates, and a piston axially slidable along the clutch plate carrier to engage the plurality of clutch plates;
wherein the clutch plate carrier is non-rotatably connected to the turbine shell; and
wherein an apply chamber is bounded in part by the turbine shell, the piston, and the clutch plate carrier.

2. The hybrid module according to claim 1, further comprising an output hub non-rotatably connected to the turbine shell, wherein the clutch plate carrier is non-rotatably connected to the turbine shell radially outside of the output hub.

3. The hybrid module according to claim 2, wherein the output hub includes an apply channel in fluid communication with the apply chamber, the apply chamber being further bounded in part by the output hub.

4. The hybrid module according to claim 2, wherein the piston is sealed to the output hub, the piston being axially slidable along the output hub carrier to engage the plurality of clutch plates.

5. The hybrid module according to claim 1, further comprising a K0 clutch configured to drivingly connect the rotor carrier to a K0 shaft, the K0 clutch including a housing non-rotatably connected to the radially extending portion.

6. The hybrid module according to claim 5, wherein a remainder of the plurality of clutch plates are connected to an outer surface of the housing.

7. The hybrid module according to claim 6, wherein the K0 clutch includes a plurality of further clutch plates, at least some of the further clutch plates are connected to an inner surface of the housing.

8. The hybrid module according to claim 5, wherein the lock-up clutch includes a reaction plate axially spaced from the radially extending portion, the reaction plate being connected to one of the clutch plate carrier and the housing.

9. The hybrid module according to claim 5, wherein the plurality of clutch plates are disposed radially outside of the K0 clutch.

10. The hybrid module according to claim 1, wherein the piston is sealed to an inner surface of the clutch plate carrier.

11. The hybrid module according to claim 1, wherein the at least some of the clutch plates are connected to an inner surface of the clutch plate carrier.

12. A hybrid module, comprising:
a rotor carrier including an axially extending portion and a radially extending portion; and
a torque converter assembly arranged radially inside of the axially extending portion, the torque converter assembly including:
an impeller having an impeller shell non-rotatably connected to the axially extending portion;
a turbine in fluid communication with the impeller and having a turbine shell arranged axially between the impeller and the radially extending portion; and
a lock-up clutch including a plurality of clutch plates, a clutch plate carrier connected to at least some of the plurality of clutch plates, and a piston axially slidable along the clutch plate carrier to engage the plurality of clutch plates; and
a K0 clutch configured to drivingly connect the rotor carrier to a K0 shaft, the K0 clutch including a housing non-rotatably connected to the radially extending portion;
wherein the clutch plate carrier is non-rotatably connected to the turbine shell;

wherein an apply chamber is bounded in part by the turbine shell, the piston, and the clutch plate carrier; and wherein a remainder of the plurality of clutch plates are connected to an outer surface of the housing.

13. The hybrid module according to claim 12, wherein the K0 clutch includes a plurality of further clutch plates, at least some of the further clutch plates are connected to an inner surface of the housing.

14. The hybrid module according to claim 12, further comprising an output hub non-rotatably connected to the turbine shell, wherein the clutch plate carrier is non-rotatably connected to the turbine shell radially outside of the output hub.

15. The hybrid module according to claim 14, wherein the output hub includes an apply channel in fluid communication with the apply chamber, the apply chamber being further bounded in part by the output hub.

16. The hybrid module according to claim 12, wherein the piston is sealed to an inner surface of the clutch plate carrier.

17. A hybrid module, comprising:
a rotor carrier including an axially extending portion and a radially extending portion; and
a torque converter assembly arranged radially inside of the axially extending portion, the torque converter assembly including:
an impeller having an impeller shell non-rotatably connected to the axially extending portion;
a turbine in fluid communication with the impeller and having a turbine shell arranged axially between the impeller and the radially extending portion; and
a lock-up clutch including a plurality of clutch plates, a clutch plate carrier connected to at least some of the plurality of clutch plates, and a piston axially slidable along the clutch plate carrier to engage the plurality of clutch plates; and
a K0 clutch configured to drivingly connect the rotor carrier to a K0 shaft, the K0 clutch including a housing non-rotatably connected to the radially extending portion
wherein the clutch plate carrier is non-rotatably connected to the turbine shell;
wherein an apply chamber is bounded in part by the turbine shell, the piston, and the clutch plate carrier; and
wherein the plurality of clutch plates are disposed radially outside of the K0 clutch.

18. The hybrid module according to claim 17, wherein the K0 clutch includes a plurality of further clutch plates, at least some of the further clutch plates are connected to an inner surface of the housing.

19. The hybrid module according to claim 18, further comprising an output hub non-rotatably connected to the turbine shell, wherein the clutch plate carrier is non-rotatably connected to the turbine shell radially outside of the output hub.

20. The hybrid module according to claim 19, wherein the piston is sealed to the output hub, the piston being axially slidable along the output hub to engage the plurality of clutch plates.

\* \* \* \* \*